UNITED STATES PATENT OFFICE.

LOUIS CHARLES ALEXANDRE DE CLERCQ, OF PARIS, FRANCE.

REGENERATION OF INDIA-RUBBER WASTE.

1,011,759.  Specification of Letters Patent.  Patented Dec. 12, 1911.

No Drawing.  Application filed May 9, 1910. Serial No. 560,160.

*To all whom it may concern:*

Be it known that I, LOUIS CHARLES ALEXANDRE DE CLERCQ, a citizen of the French Republic, residing at Paris, of the Department of the Seine, in France, have invented certain new and useful Improvements in the Regeneration of India-Rubber Waste, of which the following is a specification.

The invention has for its object a method of treating vulcanized indiarubber waste whereby the gums can be regenerated and again rendered soluble in their ordinary solvents a property destroyed by their vulcanization.

The process forming the object of the present invention is carried into practice in the following manner. The vulcanized rubber waste is chopped or cut into small fragments which are subjected to the action of a solvent such as spirits of turpentine. In the vulcanized state in which the fragments are subjected to the action of the spirits of turpentine, no solution can take place but the material swells, and when it has swollen to its maximum, it is treated in a digester at a temperature of between 120 and 140° C. for several hours in the presence of an excess of spirits of turpentine to which a hydrocarbon such as naphthalene has been added. The weight of naphthalene should be at least double the weight of the sulfur contained in the india-rubber treated, this weight of sulfur having been determined in the laboratory by a preliminary analysis.

The operation being finished there is withdrawn from the digester a magma containing sulfur, gum and the ordinary mineral loading materials, but in which the sulfur, as it no longer forms an intimate combination with the gums, will not prevent the latter from being acted upon by their ordinary solvents. The final stage in the process of regenerating the gums is as follows: The magma withdrawn from the digester is first of all treated with a large quantity of the solvent, spirits of turpentine for example; the mineral loading materials incorporated with the gums will fall down to the bottom of the tank; the solution will then be concentrated until it attains a syrupy consistency, it is then treated with alcohol or acetone which will precipitate the regenerated gums in carrying off the naphthalene. The small proportion of sulfur that may remain in the regenerated gums, being no longer combined, will not in any way impede the operation to which it is desired to subject these gums. If it is only desired to recover the mixture of gums and mineral loading materials freed from the combined sulfur, it is only necessary to wash in alcohol the magma withdrawn from the digester. In this manner the naphthalene contained therein is eliminated.

The process would not be modified if spirits of turpentine were replaced by some other solvent for the gums, and if the naphthalene were replaced by another hydrocarbon such as toluene, or a derivative of benzin.

I claim:

The process of regenerating vulcanized rubber waste which consists solely in subjecting the waste at a temperature of about 130° C. to the simultaneous action of spirits of turpentine and naphthalene.

In testimony whereof I have hereunto set my hand in presence of two subscribing witnesses.

LOUIS CHARLES ALEXANDRE DE CLERCQ.

Witnesses:
 H. C. COXE,
 GEORGES BOUJER.